May 15, 1956
L. A. SCHROEDER
2,745,548
APPARATUS FOR DETECTING AND REMOVING
UNCAPPED BOTTLES FROM A CONVEYOR
Filed May 17, 1954
2 Sheets-Sheet 2
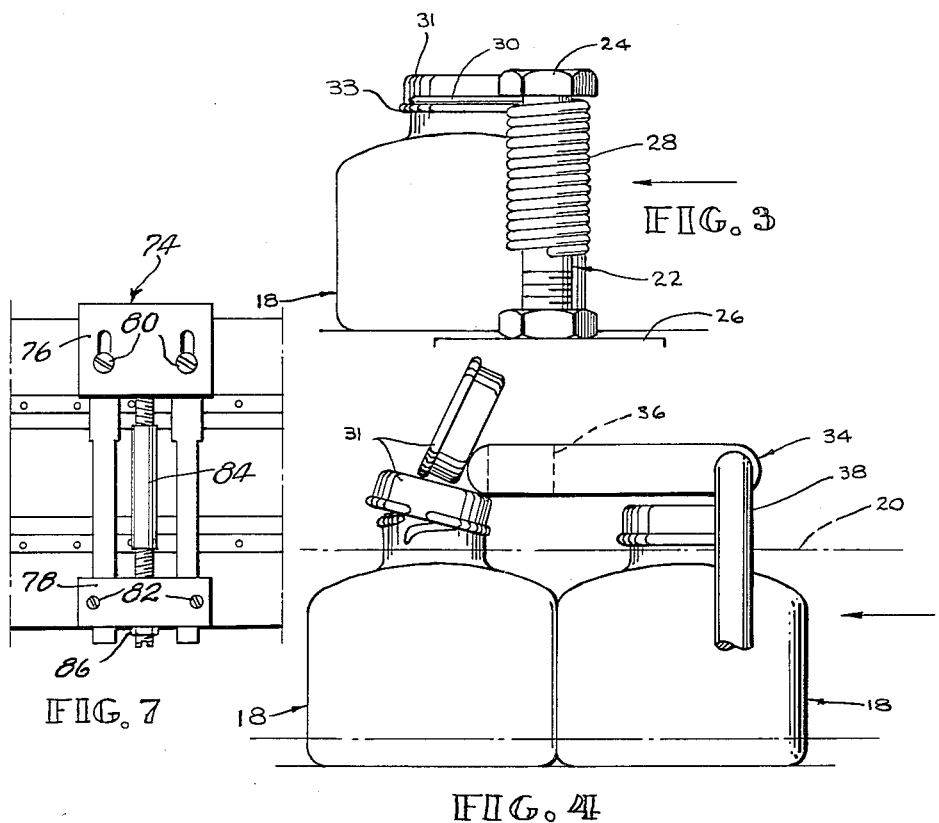
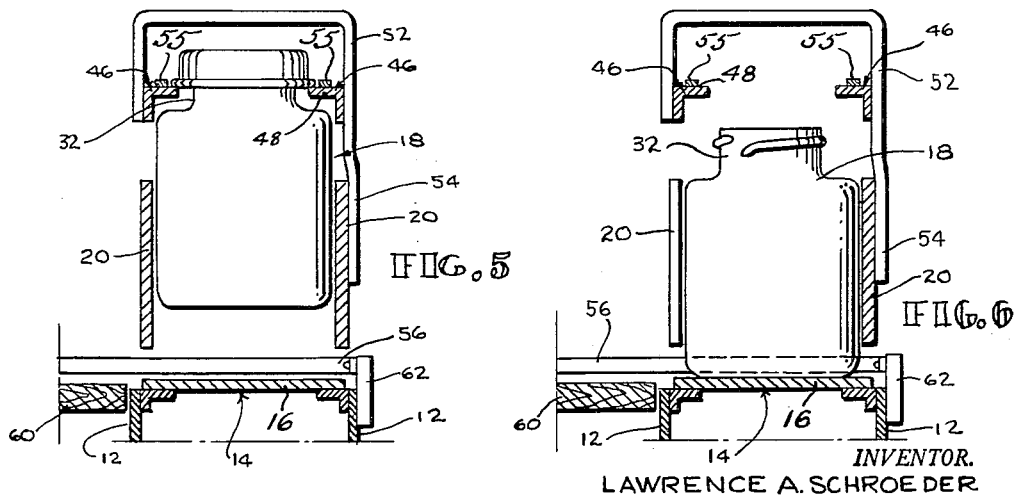
INVENTOR.
LAWRENCE A. SCHROEDER
BY
Ivan D Tefft
ATTY.

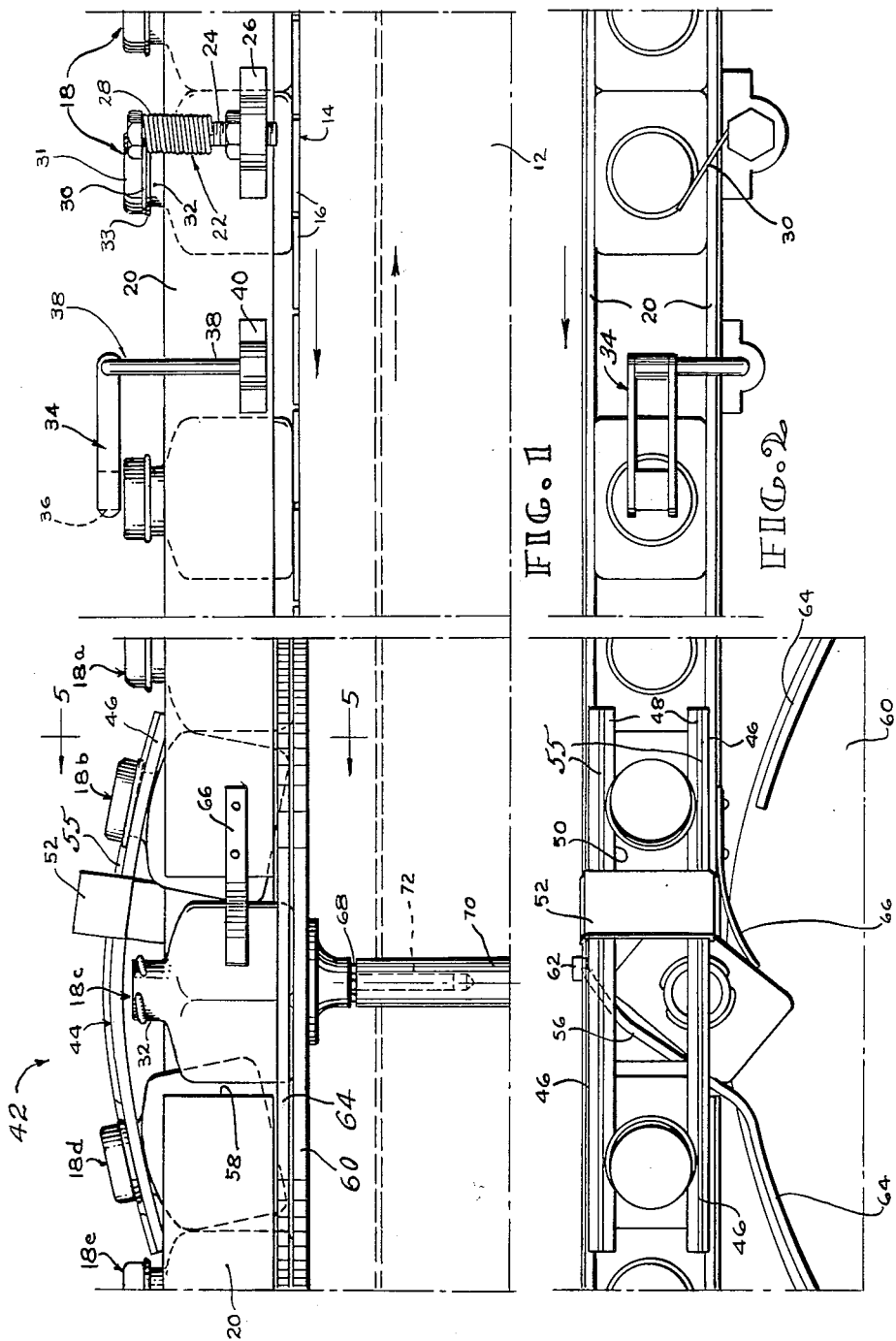

United States Patent Office 2,745,548
Patented May 15, 1956

2,745,548

APPARATUS FOR DETECTING AND REMOVING UNCAPPED BOTTLES FROM A CONVEYOR

Lawrence A. Schroeder, Menomonie, Wis., assignor to The Parker Pen Company, Janesville, Wis., a corporation of Wisconsin Application May 17, 1954, Serial No. 430,106

13 Claims. (Cl. 209—75)

The present invention relates to apparatus for detecting and removing uncapped bottles from a conveyor.

The invention is particularly adaptable to conveyors handling articles that are dumped or tumbled from the delivery end of the conveyor into a receptacle, rather than being manually removed. For example, in the case of a conveyor for ink bottles, if a bottle that is not properly capped passes through the conveyor and tumbles into the receptacle, the ink spills over those bottles preceding it, to obvious disadvantage.

An object, therefore, of the present invention is to provide apparatus for application to a conveyor which automatically removes bottles that are not properly capped, from the conveyor.

Another object is to provide apparatus of the foregoing character effective for removing the uncapped bottles from the conveyor without the necessity for stopping the conveyor.

Another and more specific object is to provide apparatus for removing uncapped bottles from a conveyor, which utilizes the cap on the bottle for segregating the capped bottles from the uncapped bottles on the conveyor.

A further object is to provide means for detecting those bottles on which the caps are not fully tightened and for fully loosening those caps, and for removing the loose caps from the bottles.

A still more specific object is to provide apparatus of the foregoing character which utilizes means which engages the cap on the bottles and thereby lifts the bottles from the conveyor, while enabling the uncapped bottles to remain on the conveyor, and deflecting means positioned for engagement by only the uncapped bottles and permitting the capped bottles to pass thereover uninterruptedly.

A further object is to provide apparatus of the character stated in the previous paragraph wherein the capped bottles are lifted or displaced only partially from the line of bottles on the conveyor so that all of the bottles remain at least partially in alignment, and the aggregate of the bottles being carried on the conveyor anterior to the bottle ejecting means are effective for forcing these bottles through the ejecting means and ejecting the uncapped bottles.

A further object is to provide novel means for receiving the uncapped bottles from the conveyor upon ejection thereof which includes a rotatable table rotated by the force caused by a succession of ejected bottles, thereby facilitating movement of the ejected bottles away from the ejecting station.

Other objects and advantages of the invention will be apparent upon reference to the following detail description taken in conjunction with the accompanying drawings wherein—

Figure 1 is a side elevational view of a segment of a conveyor showing the apparatus of the present invention;

Figure 2 is an elevational view of the conveyor and apparatus of Figure 1;

Figure 3 is an enlarged detail view of the means for loosening the caps on the bottles as they pass along the conveyor;

Figure 4 is an enlarged detail view of the magnet means for lifting the loose caps from the bottles;

Figure 5 is a sectional view taken substantially on line 5—5 of Figure 1 and showing a capped bottle passing through the elevator means;

Figure 6 is a view similar to Figure 5 but showing an uncapped bottle passing through the elevator means; and Figure 7 is a fragmentary view of a modified construction of elevator means including adjusting means.

Referring now in detail to the drawings, the apparatus is applied to a conveyor which, except for the present invention, may be regarded as a conventional conveyor of suitable size, shape and other characteristics for conveying ink bottles along a production line. For convenience, the apparatus may be applied to the conveyor immediately after the capping operation and before the labeling operation.

The conveyor may be of any suitable type, and herein includes a stand which may be in the form of a pair of side walls 12 in which is operatively mounted a conveyor belt 14. The conveyor belt also may be of any suitable type, having a plurality of links 16 in articulated arrangement and having preferably a flat substantially planar upper surface for receiving and supporting the ink bottles 18. The ink bottles 18 are guided by side plates 20 suitably mounted on the stand 12, and spaced apart a suitable distance for the purpose, and preferably spaced so as to accommodate slight variations in widths of bottles.

The ink bottles 18 are provided with screw-type caps (see Figures 4 and 6). The screw threads may be simply two segments on opposite sides, and parted or separated, and the cap has threading elements preferably in the form of simple lugs arranged for insertion between the thread segments on the bottle and engagement with the under surface thereof in response to turning of the cap. Full threads may also be utilized, if desired, in the utilization of the present invention. The particular bottle herein disclosed and used as an example is of the type put out by The Parker Pen Company for its Superchrome ink.

The cap loosening device indicated in its entirety at 22 includes a stem or bolt 24 supported in a bracket 26 which may be mounted in any convenient location on the conveyor. A coil spring 28 surrounds the bolt 24 with its lower end anchored in the bolt and its upper end extended to form a spring finger 30 that projects into the path of the bottles on the conveyor. The bolt 24 is adjustably mounted in the bracket 26 so that the spring finger 30 may be positioned vertically for engagement with the bottle caps 31 at the appropriate location thereon, which is preferably just above the bead 33; it will be noted that the bead 33 is of somewhat greater dimension than the neck 32 of the bottle. The spring finger 30 is, of course, yieldable and as the bottles pass along the conveyor the spring finger engages each cap. Those caps that are tightened fully are not affected by the loosening device; the strength of the spring being selected accordingly. However, if any of the caps 31 are not fully tightened on the bottles the spring finger 30 exerts sufficient friction against the caps to effect full loosening thereof. The loosening device is appropriately positioned for effecting turning movement of the caps in the proper direction for loosening them.

After the bottles pass the cap loosening device, the loose caps are lifted off of the bottles for preparing the bottles for the ejecting operation which utilizes means for cooperation with the caps on the bottles.

The cap lifting device indicated in its entirety at 34 includes a magnet 36 suitably mounted on a support 38 which in turn is supported by any convenient means such as a mounting bracket 40 conveniently located on the conveyor structure. The magnet 36 is positioned closely adjacent and above the bottles and extends longitudinally therealong. It will be understood that the caps 31 are of magnetic material, such caps being well known; the caps that have been fully loosened by the cap loosening device are, when they pass under the magnet 36, lifted from the bottles by the magnet and held thereon. It is to be noted that the magnet 36 is positioned above the bottles a distance less than the vertical height of the caps. This relationship is provided so that when a cap is lifted from the bottle by the magnet and held thereby, a succeeding bottle will engage the cap so held and force the held cap to the far end (left end Figure 1) of the magnet so as to clear the under surface of the magnet for action in lifting a succeeding loose cap. The action is illustrated in Figure 4 where a preceding cap is pushed along by a succeeding cap and turned up over the rounded end of the magnet. Actually, a loose cap is so moved by its own bottle at least to a position adjacent the far end of the magnet, but it is moved entirely clear of the under surface of the magnet by a succeeding bottle. These caps may accumulate on the magnet in substantial numbers, some falling off, and others remaining until manually removed, thus eliminating the necessity for an operator to be constantly present to remove each cap from the magnet following a lifting operation of a loose cap.

The means for effecting selection of the uncapped bottles and the ejection thereof from the conveyor is shown in its entirety at the left half portion of Figures 1 and 2 and indicated at 42.

This means includes an elevator 44 which is made up of a pair of longitudinally extending bars 46 which may, for convenience, be in the form of angle pieces (Figures 5 and 6) arranged with respective legs 48 positioned horizontally over the conveyor and spaced apart to define a slot 50 open at both ends and extending through the elevator means. These angle pieces 46 may be supported by any convenient means such as a bracket 52 mounted at 54 at any suitable location on the conveyor structure. The channel or slot 50 is of predetermined transverse dimension, namely, wide enough for the neck 32 of the bottle (including the threads) to pass therethrough uninterrupted, but narrow enough to engage the bead 33 on the cap so that the capped bottles are lifted from the conveyor in passing through the elevator, as will be explained more fully hereinafter. In the device of Figures 1–6, such angle pieces are at a fixed spacing, but the arrangement of Figure 7 includes means for adjusting the angle pieces, as will be described later. The bars are provided with beads 55 extending longitudinally and spaced a short distance from the edge of the channel 50. The lugs forming the threads on a bottle cap are depressed inwardly, and at these points the bead on the cap is interrupted; if the bottle should enter the elevator with these points at the elevator bars, it may tip and not be carried properly. The beads 55 center the bottle, and prevent such tipping.

The angle pieces 46 provide inclined surfaces for lifting the bottles from the conveyor and preferably are in the form of arcuate pieces with their ends at an appropriate height for engagement with the beads on the caps. The central portion of the angle pieces is raised so that when the bottles are positioned at that portion, they are raised above the conveyor belt. The trailing end of the angle pieces 46 (left end Figures 1 and 2) is also relatively low so that the ink bottles after passing thereover will be lowered onto the conveyor belt gradually rather than by an abrupt drop. The rise in the angle pieces 46, may be as great as desired to lift the bottles the appropriate height and, of course, the length of these pieces may be as desired to provide a convenient degree of inclination. Furthermore, the angle pieces at their center are sufficiently high to permit the uncapped bottles resting on the conveyor belt to pass out of the conveyor thereunder.

Those bottles that are uncapped instead of being lifted by the elevator means pass therethrough without being lifted. As illustrated in Figure 6, the slot 50 is sufficiently wide to enable the necks 32 of the bottles to pass therethrough and, therefore, the uncapped bottles remain resting on the conveyor belt. A deflector element 56 is provided for engagement by the uncapped bottles resting on the conveyor and deflecting them out through a side opening 58 in one of the side plates 20 onto a table 60. The deflector element 56 may be in the form of a rod or bar anchored at one end at 62 at the side of the conveyor opposite the opening 58. The deflector element is positioned immediately above the upper conveyor belt 14, extending transversely thereacross, but inclined or disposed diagonally (Figure 2) out through the opening 58 and over the table 60. The outer extended end of the deflector bar 56 is preferably in circular form, forming a guide or guard 64 extending around the greater portion of the table adjacent the periphery thereof, for guiding the ink bottles in their movement onto the table, as will be explained presently. The deflector bar 56 is of such dimension and is so located as to be below the bottles lifted by the elevator means but will, of course, be engaged by the uncapped bottles which rest on the conveyor belt. In the movement of the stream of bottles through the device 42 the uncapped bottles are deflected by the deflector bar 56 out through the opening and onto the table.

Preferably a resilient spring means 66 is provided for engaging the bottles as they are ejected to guard against random movement of the ejected ink bottles.

As was noted above, the conveyor belt has, in the present instance, a flat substantially planar upper surface so that the ink bottles are carried therealong by friction. The conveyor belt is free of lugs or projections for engaging the bottles and positively moving them along. The movement of the bottles through the elevator means and ejecting means is effected by the stream of bottles anterior thereto. For example, attention is directed to the series of bottles 18a to 18e in Figure 1. The bottle 18a engages the bottle 18b which has started its movement up the elevator means and the aggregate of bottles anterior thereto forces the bottle through the elevator. Since all of the bottles are moved by friction from the conveyor, the uncapped bottle 18c is moved in the same manner, that is, the bottle 18b engages the bottle 18c and forces the latter out through the side opening 58. The bottle 18c, at least through a portion of its movement through the elevator means, engages the bottle 18d and forces the latter through the elevator. However, after the bottle 18c disengages the bottle 18d and moves out through the side opening, the bottle 18d may be motionless for a short period if it has not already engaged the conveyor belt, until the succeeding bottle 18b engages it and moves it along.

In order to facilitate movement of the ejected bottles out of the conveyor, I have provided that the table 60 be rotatable and the bottles deposited on the table in such position and direction of movement that succeeding bottles engage the previous ones and cause rotation of the table, thereby moving the ejected bottles away from the outlet opening in the conveyor.

To this end the table 60 is provided with anti-friction bearing means which may be in the form of ball bearings 68 disposed between the rotatable table top and the stand 70 in which it is mounted. The table top may have a stem 72 fitted in a bore in the stand 70 for guiding the table top, while the ball bearings 68 enable easy rotation of the table top. The bottles are ejected onto the table in a generally tangential direction and succeeding bottles engage the previous bottles and in forcing the previous bottles, rotate the table top. The guard 64 serves to retain the bottles on the table. The ejected bottles may accumulate to a number which substantially form a circle entirely around the table, and thereby a minimum of attention is required for manually removing the ejected bottles.

The construction of Figure 7 includes means for adjusting the bars 46 toward and from each other, so as to accommodate different size caps. The bars are supported by a mounting means 74, corresponding to bracket 52 above, which includes spaced parts 76 and 78. To adjust the bars, set screws 80 and 82 are loosened, and adjusting screw 84 is manipulated to move the bars toward or from each other. A lock nut 86 may conveniently be provided on the adjusting screw 84.

I claim:

1. Apparatus for application to a conveyor having a belt carrying capped bottles of the character in which the cap has a portion of greater dimension than the portion of the bottle immediately adjacent the cap and to which the cap is applied, comprising in combination, means for removing loose caps from the bottles, means at an ejecting station posterior to the first means for engaging the caps remaining on the bottles and removing the bottles slightly from the conveyor belt while enabling them to move therealong; said last means including members positioned for engaging the caps and permitting uncapped bottles to pass uninterrupted therepast, and deflector means at the ejecting station positioned for engagement by the uncapped bottles remaining on the conveyor belt but permitting the capped bottles to pass uninterrupted therepast.

2. Apparatus for application to a conveyor having a belt carrying capped bottles of the character in which the cap has a portion of greater dimension than the portion of the bottle immediately adjacent the cap and to which the cap is applied, comprising in combination first means for engaging the caps and fully loosening those that are partially loose, second means posterior to the first means for removing the fully loosened caps from the bottles, third means at an ejection station posterior to the second means for engaging the caps remaining on the bottles and lifting the bottles from the conveyor belt, said last means including members positioned for engaging the caps and permitting uncapped bottles to pass uninterrupted therepast, and deflector means at the ejecting station positioned for engagement by the uncapped bottles remaining on the conveyor belt but permitting the lifted capped bottles to pass uninterrupted therepast.

3. Apparatus for application to a conveyor having a belt carrying capped bottles, comprising in combination, means for loosening and removing those caps that are not fully tightened, means posterior to the first means for engaging the caps remaining on the bottles and lifting those bottles from the conveyor belt and permitting the uncapped bottles to rest on the conveyor belt, and means adjacent the bottle lifting means for deflecting the uncapped bottles from the conveyor.

4. Apparatus for application to a conveyor having a belt carrying bottles having screw caps, comprising in combination, yieldable friction means engageable with the caps on a side positioned and operative for fully loosening those caps that are not fully tightened, means posterior to the loosening means for lifting the loosened caps from the bottles, means posterior to the cap lifting means for engaging the caps remaining on the bottles and lifting those bottles from the conveyor belt and permitting the uncapped bottles to rest on the conveyor belt, and means adjacent the bottle lifting means for deflecting the uncapped bottles from the conveyor.

5. Apparatus for application to a conveyor having a belt carrying bottles having screw caps, comprising in combination, coil spring means mounted on one side of the conveyor with an extension finger projecting into the path of the bottles and positioned for yieldingly engaging the caps and of sufficient strength to fully loosen those caps that are not fully tightened, means posterior to the loosening means for lifting the loosened caps from the bottles, means posterior to the cap lifting means for engaging the caps remaining on the bottles and lifting those bottles from the conveyor belt and permitting the uncapped bottles to rest on the conveyor belt, and means adjacent the bottle lifting means for deflecting the uncapped bottles from the conveyor.

6. Apparatus for application to a conveyor having a belt carrying bottles having caps of magnetic material, comprising in combination, means for fully loosening those caps that are not fully tightened, magnet means posterior to the loosening means for lifting the loose caps from the bottles, means posterior to the magnet cap lifting means for engaging the caps remaining on the bottles and lifting those bottles from the conveyor belt and permitting the uncapped bottles to rest on the conveyor belt, and means adjacent the bottle lifting means for deflecting the uncapped bottles from the conveyor.

7. The combination set forth in claim 6 wherein the magnet means is positioned above the caps a distance less than the vertical dimension of the caps whereby a cap lifted by and held by the magnet means is forced from the under side of the magnet means by succeeding bottles and the active lifting surface of the magnet means is cleared for attracting succeeding loose caps.

8. Apparatus for application to a conveyor having a belt carrying capped bottles of the type having a neck, and a cap thereon having a portion of greater dimension than the neck, comprising in combination, means for removing those caps that are not fully tightened, elevator means posterior to the cap removing means for engaging the caps on the bottles and lifting the bottles from the conveyor belt and permitting the uncapped bottles to remain on the conveyor belt and pass uninterrupted through the elevator means, the lifted bottles and the uncapped bottles being at least partially in alignment whereby both the lifted and the uncapped bottles in the zone of the elevator means are moved by the stream of bottles on the conveyor anterior thereto, and deflecting means positioned immediately above the conveyor belt and below the elevator means for engagement by the uncapped bottles and operative for deflecting them from the conveyor and positioned below the lifted bottles.

9. Apparatus for application to a conveyor having a belt carrying capped bottles of the type having a neck and a cap thereon having a portion of greater dimension than the neck, comprising in combination, means for removing those caps that are not fully tightened, elevator means posterior to the cap removing means for engaging the caps on the bottles and lifting the bottles from the conveyor belt, said elevator means including a pair of longitudinally extending bars over the conveyor spaced apart for receiving the necks of the bottles and engagement by the caps on the under surface of the side edges of the caps, said bars forming inclined surfaces with their ends positioned vertically for cooperation with the bottles as stated when the bottles are resting on the conveyor belt and the center portion being raised so that the bottles thereon are lifted above the conveyor, the uncapped bottles remaining on the conveyor belt and passing between the bars, and deflecting means immediately above the conveyor belt and under the center portion of the bars engaged by the uncapped bottles on the belt and operative for deflecting them from the conveyor.

10. Apparatus for application to a conveyor having a belt carrying capped bottles of the type having a neck and a cap thereon having a portion of greater dimension than the neck, comprising in combination, means for removing those caps that are not fully tightened, elevator means posterior to the cap removing means for engaging the caps on the bottles and lifting the bottles from the conveyor belt and permitting the uncapped bottles to remain on the conveyor belt and pass uninterrupted through the elevator means, the lifted bottles and the uncapped bottles being at least partially in alignment whereby both the lifted and the uncapped bottles in the zone of the elevator means are moved by the stream of bottles on the conveyor anterior thereto, deflecting means positioned immediately above the conveyor belt and below the elevator means for engagement by the uncapped bottles and operative for deflecting them from the conveyor and positioned below the lifted bottles, and rotatable table means positioned for receiving the bottles ejected from the conveyor in a direction generally tangential to the table.

11. Apparatus for application to a conveyor having a belt carrying capped bottles of the type having a neck and a cap thereon having a portion of greater dimension than the neck, comprising in combination, means for removing those caps that are not fully tightened, elevator means posterior to the cap removing means for engaging the caps on the bottles and lifting the bottles from the conveyor belt and permitting the uncapped bottles to remain on the conveyor belt and pass uninterrupted through the elevator means, the lifted bottles and the uncapped bottles being at least partially in alignment whereby both the lifted and the uncapped bottles in the zone of the elevator means are moved by the stream of bottles on the conveyor anterior thereto, deflecting means positioned immediately above the conveyor belt and below the elevator means for engagement by the uncapped bottles and operative for deflecting them from the conveyor and positioned below the lifted bottles, and rotatable table means positioned for receiving the bottles ejected from the conveyor in a direction generally tangential to the table, said deflector means extending over the table and around a substantial portion of its periphery forming a guard for retaining the ejected bottles on the table.

12. Apparatus for application to a conveyor having a belt for carrying capped bottles of the type having a relatively narrow neck and a screw threaded cap of magnetic material having a bead of larger dimensions than the neck and threads thereon, comprising in combination, coil spring means mounted on one side of the conveyor with an extension finger projecting into the path of the bottles and positioned for yieldingly engaging the caps and of sufficient strength to fully loosen those caps that are not fully tightened, magnet means posterior to the loosening means for lifting the loose caps from the bottles, said magnet means being positioned above the bottles a distance less than the vertical dimension of the caps, elevator means posterior to the cap lifting means including a pair of longitudinally extending bars over the conveyor spaced apart for receiving the necks of the bottles and engagement by the caps on the under surface of the side edges of the caps, said bars forming inclined surfaces with their ends positioned vertically for cooperation with the bottles as stated when the bottles are resting on the conveyor belt and the center portion being raised so that the bottles thereon are lifted above the conveyor belt, the uncapped bottles remaining on the conveyor belt and passing between the bars, deflecting means immediately above the conveyor belt and under the center portion of the bars engaged by the uncapped bottles on the conveyor belt and operative for deflecting them from the conveyor, and rotatable table means positioned for receiving the bottles ejected from the conveyor in a direction generally tangential to the table, said deflector means extending over the table and around a substantial portion of its periphery forming a guard for retaining the ejected bottles on the table.

13. The combination set forth in claim 9 wherein the elevator bars have longitudinal beads on their upper surfaces adjacent to but spaced from their inner edges, and means is provided for adjustably moving the bars toward and from each other.

References Cited in the file of this patent
UNITED STATES PATENTS

| | | |
|---|---|---|
| 2,346,549 | Belada | Apr. 11, 1944 |
| 2,377,431 | Lakso | June 5, 1945 |
| 2,440,030 | Thomas | Apr. 20, 1948 |
| 2,529,603 | Galt | Nov. 14, 1950 |
| 2,653,713 | Siegal | Sept. 29, 1953 |
| 2,654,478 | Stem | Oct. 6, 1953 |
| 2,665,005 | Mundy | Jan. 5, 1954 |
| 2,689,647 | Hofstetter et al. | Sept. 21, 1954 |